US008443821B2

(12) United States Patent
Meier et al.

(10) Patent No.: US 8,443,821 B2
(45) Date of Patent: May 21, 2013

(54) METHOD FOR DETERMINING THE PATH AND PRESSURE WEAR CONDITION OF A VALVE MECHANISM AND VALVE ARRANGEMENT USING SUCH A VALVE

(75) Inventors: Urs E. Meier, Wuerenlingen (CH); Detlef Pape, Nussbaumen (CH)

(73) Assignee: ABB Technology AG, Zürich (CH)

( * ) Notice: Subject to any disclaimer, the term of this patent is extended or adjusted under 35 U.S.C. 154(b) by 392 days.

(21) Appl. No.: 12/637,339

(22) Filed: Dec. 14, 2009

(65) Prior Publication Data

US 2010/0147395 A1 Jun. 17, 2010

(30) Foreign Application Priority Data

Dec. 15, 2008 (DE) ......................... 10 2008 062 289

(51) Int. Cl.
*F17D 5/04* (2006.01)

(52) U.S. Cl.
USPC ............... 137/1; 251/129.04; 251/61; 73/168

(58) Field of Classification Search
USPC ............ 137/1, 551, 554, 557, 47, 51; 251/61, 251/61.5, 129.04; 73/9, 168
See application file for complete search history.

(56) References Cited

U.S. PATENT DOCUMENTS 3,922,111 A 11/1975 Deters
4,029,122 A * 6/1977 Jaegtnes ........................ 137/551
4,274,438 A 6/1981 La Coste
4,566,310 A * 1/1986 Cohen et al. ........................ 73/9
4,976,144 A 12/1990 Fitzgerald
5,197,328 A * 3/1993 Fitzgerald ....................... 73/168
5,231,469 A * 7/1993 Jeffers et al. .................. 356/614

(Continued)

FOREIGN PATENT DOCUMENTS

DE 42 18 320 A1 12/1993
DE 102 09 545 A1 10/2003

(Continued)

OTHER PUBLICATIONS

Non-English German Office Action dated Jun. 26, 2009 issued in DE 10 2008 062 292.3-14.

(Continued)

*Primary Examiner* — Eric Keasel
*Assistant Examiner* — Minh Le
(74) *Attorney, Agent, or Firm* — Buchanan Ingersoll & Rooney PC

(57) ABSTRACT

A method for sensor operating-state determination of a valve arrangement to control a process medium flow through a pipeline having a valve element, arranged such that it can move axially within a valve housing via a pneumatic actuating drive by application of control pressure, with the control pressure being measured and evaluated in order to determine the sliding friction during the movement. The valve element can be moved at a constant speed over at least a subarea of the travel movement, the value of which speed is measured via a position sensor system for signal processing, with the currently applied control pressure being measured at approximately the same time for signal processing via a pressure sensor system. The current sliding friction of the valve element can be determined as a measure of wear state from both measured values, by an electronic evaluation unit, based on a proportional drive force expressed by the control pressure which occurs when the valve element is traveling at a constant speed.

12 Claims, 2 Drawing Sheets

5
6
10
8
7
12
9
4
11
1 2 3

U.S. PATENT DOCUMENTS

| | | | | |
|---|---|---|---|---|
| 5,424,941 | A | 6/1995 | Bolt et al. | |
| 6,267,138 | B1 * | 7/2001 | Hoffmann et al. | 137/551 |
| 6,382,226 | B1 * | 5/2002 | Larson et al. | 137/1 |
| 6,453,261 | B2 | 9/2002 | Boger et al. | |
| 6,745,084 | B2 * | 6/2004 | Boger et al. | 700/13 |
| 7,089,086 | B2 * | 8/2006 | Schoonover | 700/275 |
| 7,266,427 | B2 * | 9/2007 | Hansen et al. | 700/282 |
| 7,694,936 | B2 * | 4/2010 | Hoffmann et al. | 251/129.04 |
| 8,122,905 | B2 * | 2/2012 | Pape et al. | 137/554 |
| 2008/0257428 | A1 * | 10/2008 | Scholz et al. | 137/554 |
| 2010/0152907 | A1 | 6/2010 | Meier et al. | |
| 2010/0152908 | A1 * | 6/2010 | Meier et al. | 700/282 |
| 2010/0179697 | A1 * | 7/2010 | Stelter et al. | 700/282 |

FOREIGN PATENT DOCUMENTS

| | | | |
|---|---|---|---|
| DE | 102 22 890 | A1 | 12/2003 |
| EP | 0 739 503 | B1 | 10/1996 |
| EP | 1 812 718 | B1 | 8/2007 |
| WO | WO 2005/109140 | A1 | 11/2005 |

OTHER PUBLICATIONS

Non-English German Office Action dated Aug. 10, 2009 issued in DE 10 2008 064 359.9-14.

German Search Report dated Jun. 26, 2009.

* cited by examiner

METHOD FOR DETERMINING THE PATH AND PRESSURE WEAR CONDITION OF A VALVE MECHANISM AND VALVE ARRANGEMENT USING SUCH A VALVE

RELATED APPLICATION

This application claims priority under 35 U.S.C. §119 to German Patent Application No. 10 2008 062 289.3 filed in Germany on Dec. 15, 2008, the entire content of which is hereby incorporated by reference in its entirety.

FIELD

The present disclosure relates to a sensor operating-state determination, for example, of a valve arrangement to control a process medium flow whose valve element is moved by application of control pressure by a pneumatic actuating drive, with the control pressure being measured and evaluated in order to determine friction during movement.

BACKGROUND INFORMATION

The term "position regulator" used in this disclosure represents a mechatronic system which controls auxiliary energy of an actuating drive, such as a pneumatic actuating drive, on the basis of one or more input signals in order to move the valve element to a specific position. In order to operate, the position regulator can use pressurized gas (e.g., compressed air) as auxiliary energy, and electrical energy as well.

Pneumatic position regulators are known which operate a process valve. With a pneumatic system, the drive chambers of a single-acting or double-acting pneumatic actuating drive are ventilated or vented deliberately as a function of one or more input signals. The pneumatic system can include an auxiliary energy supply line, one or more pilot valve arrangements and control pressure supply lines to the drive chambers in order to control the ventilation and/or venting of the drive chambers. The movements and positions of the valve element can be represented as one or more signals with the aid of a position sensor as a position feedback sensor system. Furthermore, a control electronics system can be provided which has a microcontroller and receives one or more input signals. The firmware in the control electronics processes the input signals and the signals from the position sensor system to form output signals which are used as input signals for the pneumatic system.

The firmware on the position regulator implements a function which analyzes the dynamic characteristics of the enclosed pneumatic actuating drive. During startup, the actuating range of the valve element is moved through once during an initialization process, and an initial value and final value of the actuating range are recorded.

Actuating operations are subdivided into pivoting drives and linear-movement drives. In the case of a linear-movement drive, the linear movement of the output drive of the actuating drive is transmitted directly to a linearly operating actuating member. In contrast, in the case of a pivoting drive, the linear movement of the output drive of the actuating drive is converted to a rotary movement by suitable device (e.g., mechanical linkage).

The pneumatic actuating drive and the position regulation are linked by a fitting kit. The fitting kit can include components which transmit the movement and position of the actuating drive with respect to the position feedback sensor system to the positioning regulator.

During operation of process valves for the purposes stated above, an unpredicted failure of a single valve can adversely affect an entire production installation or the like. In the extreme, this can lead to a total shutdown. In order to cope with this, attempts have already been made to carry out preventative replacement after an estimated life of the valve mechanism has elapsed. In this method, the replacement was, however, frequently carried out even well before the actual wear limit, since there is a wide scatter between the estimated life and the actual life.

EP 0 739 503 B1 discloses a valve arrangement having a position regulator which also has a diagnosis device for operating state monitoring. The positioning regulator of the valve element, which in this case is in the form of a closure body for a valve seat, operates on the basis of an electrical actuating signal which is predetermined externally. An appropriate sensor system within the positioning regulator measures the current disturbance of the valve element and the control pressure to and from the drive chambers is influenced in order to move the valve element to the desired position. The control pressure is provided by an external control pressure shaft and is supplied to the drive chamber from an internal pilot valve arrangement, depending on the actuating signal, or the drive chamber is vented in order to move the valve element in the correct direction. In this case, the movement is carried out by an integrated resetting spring.

Because component dimensions can be quite small and the switching frequencies can be quite high, the valve mechanism of a pilot valve arrangement can be particularly sensitive to dirt which causes wear and which can be transported in particular by the compressed air in the area of the sensitive pilot valve arrangement. A failure of the pilot valve arrangement can lead to a defect in the pneumatic system, which can result in the entire valve arrangement being shut down. In addition to dirt, leakages should be avoided, in particular in the area of the pneumatic lines between the pneumatic valve and the connected actuator.

WO 2005/109140 A1 discloses an electronic evaluation unit for monitoring the operating state of a valve arrangement. The pressure in front of and behind the valve element of a pneumatic valve is measured for this purpose. Furthermore, the opening cross section of the valve element is determined by a position sensor system. The gas flow rate through the pilot valve is calculated using this data. Conclusions about the operating state of the pneumatic valve can be drawn by analysis of the gas flow rate in actual operating conditions. It is thus possible to obtain indications of a normal operating state or of a fault state, in order to take maintenance measures in good time.

This electronic evaluation unit for diagnosis of the operating state involves a sensor complexity which can be quite high. This is because different pressure sensors and additional sensors are used and undetailed information is made available about the pneumatic system in order to make it possible to detect a malfunction in the system.

In other known systems, the control pressure acting on a valve element can be determined and evaluated by sensors in order to determine the sliding friction during the movement of the valve element. Since the control pressure is proportional to the drive force of the valve element if the control piston diameter is constant, it is possible to use the measured pressure value to determine the drive force required to move the valve element. If the drive force increases over the course of the operating time of the pneumatic valve, then this can be an indication of increasing wear.

SUMMARY

A method is disclosed for sensor operating-state determination of a valve arrangement to control a process medium flow through a pipeline, a valve element being arranged to move axially within a valve housing via a pneumatic actuating drive by application of control pressure, with the control pressure being measured and evaluated to determine sliding friction of the valve element during movement, the method comprising: moving the valve element at a constant speed over at least a subarea of the travel movement; measuring a value of speed via a position sensor system for signal processing; measuring an applied control pressure at approximately a same time as the measuring of speed for signal processing via a pressure sensor system; and determining a current sliding friction of the valve element as a measure of wear state from the measured speed and control pressure values using an electronic evaluation unit and a proportional drive force expressed as control pressure which occurs when the valve element is traveling at a constant speed.

A valve arrangement is disclosed for controlling a process medium flow through a pipeline, comprising: a pneumatic actuating drive for moving a valve element arranged to move axially in a valve housing by application of control pressure; means for measurement and evaluation of applied control pressure to determine friction of the valve element during movement of the valve element at a constant speed over at least a subarea of travel distance, the measurement and evaluation means including a position sensor system for measuring a value of constant speed, and a pressure sensor system for measuring the applied control pressure at approximately the same time the constant speed is measured, and wherein the measurement and evaluation means determines a current sliding friction of the valve element as a measure of wear state from the speed and control pressure values by calculating a proportional drive force which is expressed by control pressure which occurs when the valve element is traveling at a constant speed.

BRIEF DESCRIPTION OF THE DRAWINGS

Other features and advantages of the present invention will be explained in more detail in the following text together with the description of exemplary embodiments of the disclosure, on the basis of the figures, in which.

DETAILED DESCRIPTION

Figure 1:
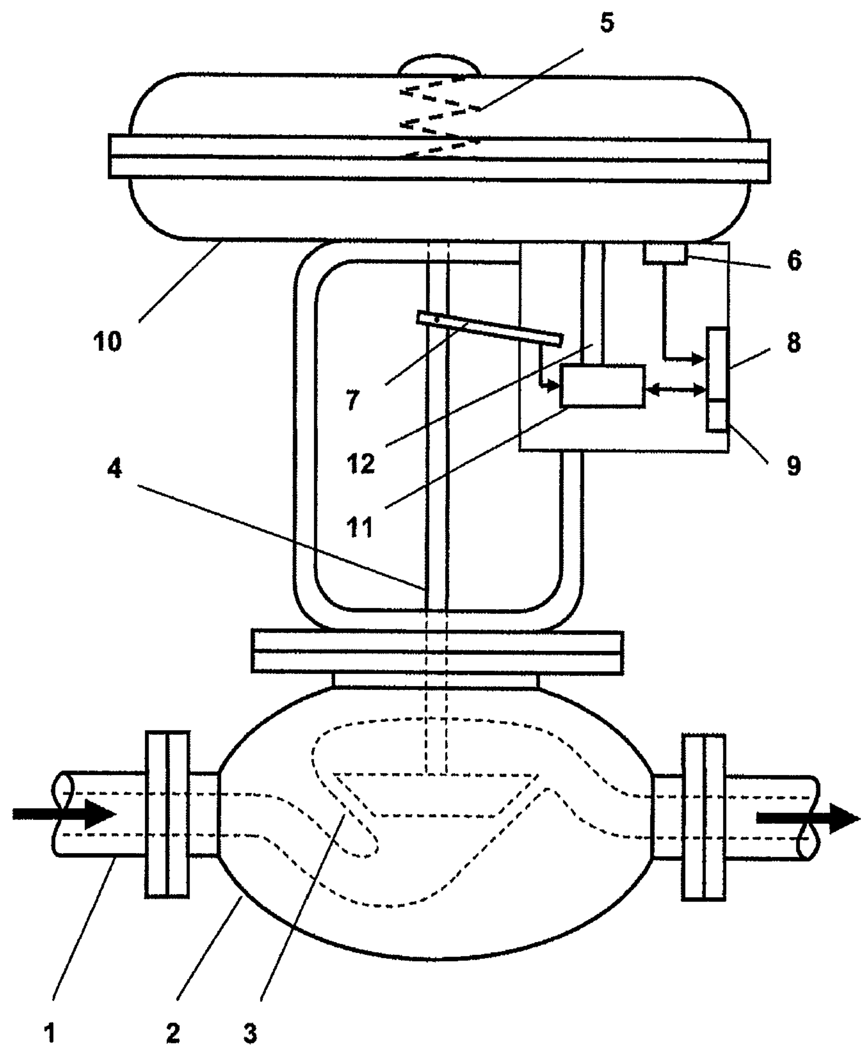
FIG. 1 shows a schematic illustration of an exemplary valve arrangement with integrated means for measurement and evaluation of the control pressure in order to, for example, deduce the wear state of the valve mechanism.

Methods are disclosed for sensor operating-state determination of a valve mechanism based on evaluation of sliding friction that occurs, such that it is possible to draw a conclusion which is as precise as possible of the current sliding friction of the valve element by the inclusion of highly valid measured values.

The disclosure includes an exemplary method whereby a valve element is moved at a constant speed over at least a subarea of travel movement, the value of which speed can be measured via a position sensor system for signal processing. The currently applied control pressure can be measured at the same time (i.e., at approximately the same time within a specified tolerance such as within approximately 0.1 sec. or lesser, or greater) for signal processing via a pressure sensor system. The current sliding friction of the valve element can be determined as a measure of the wear state from both measured values, by means of an electronic evaluation unit, from a proportional drive force which is expressed by the control pressure which occurs when the valve element is traveling at a constant speed.

According to exemplary embodiments, a position sensor system which measures the position of the valve element is combined in a specific manner with a pressure sensor system which detects the control pressure to allow sliding friction values to be determined more accurately by making it possible to deduce progressive wear by comparison with historical sliding friction values. Since the position sensor system provides an auxiliary way of determining the control pressure used for movement of the valve element when the valve element is moving at a constant speed, this makes it possible to very largely preclude disturbance influences that corrupt the measured value. This is because movement phases at a constant speed can eliminate disturbance influences which are caused by a pressure change in the pneumatic valve or by static friction.

The evaluation unit can compare the pressure measured value of at least two measurements, which are carried out with a time interval between them, for the same speed measured value in order to determine the wear state. The friction parameters can be calculated from the respective pressure measured values and the comparison process can be carried out to determine whether they have deteriorated, thus indicating progressive wear. In this case, the time interval should be chosen such that significant changes can be perceived by the measurement. Depending on the switching frequency, this can invariably be done at an interval of, for example, several days. However, as an alternative to this, it is possible to detect the pressure measured values that are associated here for different speed measured values, in which case the friction parameters can be calculated from the respectively obtained value pairs, taking account of the speed difference.

As start conditions for an exemplary method, the two measured values can be detected when the valve element is moving in a stable manner at a constant speed, starting from one of the rest positions, and with the corresponding static friction having been overcome. As referenced herein, a “constant” speed is a speed which is sufficiently stable (i.e., substantially stable relative to the operating range of the valve element) as to make it possible to reliably detect sliding friction in the manner disclosed herein. This makes it possible to reliably preclude initial static friction influences on the speed profile of the valve element.

Particularly in the case of a spring-reset valve element, the drive force which is derived from the measured control pressure can be corrected for the influence of the spring force of the resetting spring. Subject to this condition, an exemplary method according to the disclosure can be applicable to single-acting position drives with a resetting spring.

An exemplary evaluation unit can determine the value of the current sliding friction by means (e.g., a software module) which establishes a simplified proportional mathematical relationship to the drive force calculated for the pressure measured value. This simple measure can be used because of the direct relationship between current sliding friction and the drive force to be applied to move the valve element during a phase-constant speed.

With regard to a pneumatic actuating drive which is equipped with means to determine the sliding friction in the sense described above, the position sensor system and pressure sensor system can be directly integrated in a pilot valve which produces the control pressure. In this case, a distance measurement means for determining the axial distance between the end of the drive chamber and the active surface of the control piston can be used as a position sensor system. Any known pressure sensor can be used as a pressure sensor system, which measures the pressure within the drive chamber.

To achieve a valve element speed which is as constant as possible, control electronics can be included to calculate the current speed from the time profile of position signals determined by the position sensor system, and this speed can be kept constant by variation of the control pressure. This allows the speed of the control element to be controlled in a simple manner.

As an exemplary alternative to this, in order to achieve a constant speed of the valve element, the pilot valve which is used for application of the control pressure may also be in the form of an I/P converter with a constant nominal value preset. The constant pressure which can be achieved by an I/P converter makes it possible to produce a constant drive force which results in the actuating element moving at a constant speed, at least over a portion of its travel distance. The I/P converter can then be controlled such that it produces a constant mass flow or a constant pressure difference, which results in the desired constant speed of the valve element.

However, it is also possible to completely dispense with active components for producing a constant speed, as a result of which a measurement of the control pressure which is applied can be carried out by the pressure sensor system in the event of a randomly occurring constant speed of the valve element, which can be detected via the position sensor system. However, this exemplary approach recognizes that it may not be possible to move the valve element at a desired speed.

As shown in an exemplary embodiment of FIG. 1, a valve element 4 is arranged such that it can move axially within a valve housing 2, which is connected to a pipeline 1, of a process valve, with the valve element 4 interacting with a valve seat 3. The valve element 4 is operated by an end control piston by application of control pressure via an actuating drive 10.

The actuating drive 10 is reset by means of a resetting spring 5, which is arranged in the actuating drive 10.

A pressure system 6 which is integrated in the area of the position regulator 11 and measures the pressure within the drive chamber is provided in order to determine the sliding friction during the movement of the valve element 4. A position sensor system 7 (e.g., any sensor capable of detecting position and/or speed) is also arranged in the area of the valve element 4, and determines the current position of the valve element 4. The position sensor system 7 is used to monitor those subareas in which the valve element 4 is moving at a constant speed. Within this subarea, the pressure sensor system 6 detects the control pressure which is currently present for the actuating drive 10. A downstream evaluation unit 8 uses the two measured values to calculate the drive force that acts in the movement phases of constant speed, from the measured pressure value which is proportionally related to the current sliding friction of the valve element 4. This allows the sliding friction to be determined as a measure of the wear state.

In order to identify progressive wear, previously determined measured values of an applied control pressure for a specific speed are stored in an electronic memory 9, which is connected to the evaluation unit 8.

Figure 2:
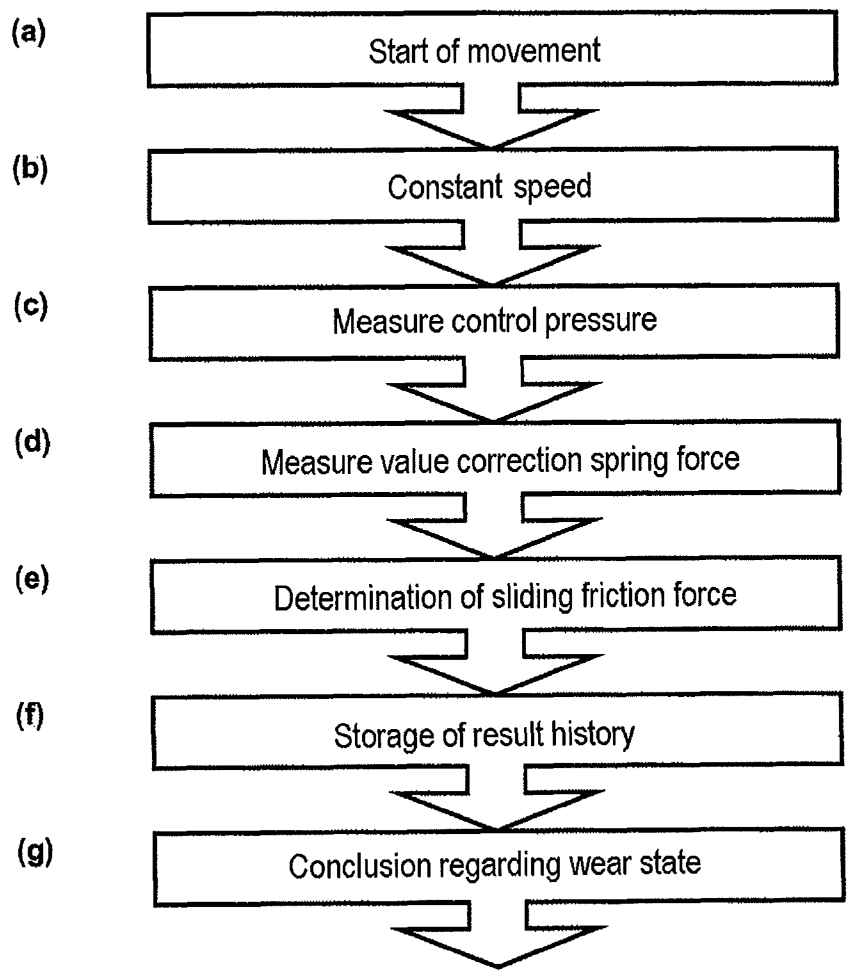
FIG. 2 shows a flowchart in order to illustrate an exemplary method for sensor operating state determination of a valve mechanism.

As shown in an exemplary method of FIG. 2, at the start (a) of the movement of the valve element, the speed is kept constant by influencing the control pressure until a constant speed (b) is reached, and this is measured (c) by sensors together with the control pressure associated with the constant speed. In the case of a spring-reset pneumatic actuating drive, the measured pressure value is then corrected (d) with respect to the spring force in order to maintain the drive force for the valve element. On the basis of this data, the sliding friction force which behaves proportionally with respect thereto is determined (e) with respect to the measured speed and is then stored (f) in order to gather historical data. This allows comparison with historical measurement data for the same speed, in order to observe a change in this data, which provides an indication of progressive wear (g) of the valve mechanism when the sliding friction increases.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Pipeline
2 Valve housing
3 Valve seat
4 Valve element
5 Resetting spring
6 Pressure sensor system
7 Position sensor system
8 Evaluation unit
9 Memory
10 Actuating drive, pneumatic
11 Position regulator
12 Pressure medium supply

What is claimed is:

1. A method for sensor operating-state determination of a valve arrangement to control a process medium flow through a pipeline, a valve element being arranged to move axially within a valve housing via a pneumatic actuating drive by application of control pressure, with the control pressure being measured and evaluated to determine sliding friction of the valve element during movement, the method comprising:
- moving the valve element at a constant speed over at least a subarea of the travel movement;
- measuring a value of speed via a position sensor system for signal processing;
- measuring an applied control pressure at approximately a same time as the measuring of speed for signal processing via a pressure sensor system; and
- determining a current sliding friction of the valve element as a measure of wear state from the measured speed and control pressure values using an electronic evaluation unit and a proportional drive force expressed as control pressure which occurs when the valve element is traveling at a constant speed.

2. The method as claimed in claim 1, comprising:
- comparing a pressure measured value of at least two measurements, which are carried out with a time interval between them, for the same speed measured value, to determine the wear state, wherein friction parameters are calculated from the pressure measured values.

3. The method as claimed in claim 1, comprising:
- comparing a pressure measured value of at least two measurements, which are carried out with a time interval between them, for different speed measured values, to determine the wear state, wherein friction parameters are calculated from pairs of speed and pressure values.

4. The method as claimed in claim 1, comprising:

detecting, as a start condition, two measured values after the valve element is moving in a stable manner at a constant speed, after having started from a rest position, with initial static friction having been overcome.

5. The method as claimed in claim 1, comprising:

deriving a drive force, for a spring-reset valve element, from a measured control pressure which is corrected for an influence of a spring force of a resetting spring.

6. The method as claimed in claim 1, comprising:

setting the drive force proportionally to current sliding friction to determine the current sliding friction.

7. A valve arrangement for controlling a process medium flow through a pipeline, comprising:

a pneumatic actuating drive for moving a valve element arranged to move axially in a valve housing by application of control pressure;

means for measurement and evaluation of applied control pressure to determine friction of the valve element during movement of the valve element at a constant speed over at least a subarea of travel distance, the measurement and evaluation means including a position sensor system for measuring a value of constant speed; and a pressure sensor system for measuring the applied control pressure at approximately the same time the speed is measured, wherein the measurement and evaluation means determines a current sliding friction of the valve element as a measure of wear state from the speed and control pressure values by calculating a proportional drive force which is expressed by control pressure which occurs when the valve element is traveling at a constant speed.

8. The valve arrangement as claimed in claim 7, wherein the position sensor system and the pressure sensor system are integrated in a position regulator which produces the control pressure.

9. The valve arrangement as claimed in claim 7, wherein to achieve a constant speed of the valve element, the measurement and evaluation means calculate current speed from a time profile of position signals determined by the position sensor system, and keep speed constant by variation of the control pressure.

10. The valve arrangement as claimed in claim 7, comprising:

at least one pilot valve for application of control pressure configured as an I/P converter with a constant nominal value preset.

11. The valve arrangement as claimed in claim 7, wherein a measurement of the applied control pressure is carried out by the pressure sensor system only when a randomly occurring constant speed of the valve element is detected via the position sensor system.

12. The valve arrangement as claimed in claim 7, wherein the actuating drive is acted on via a pressure medium supply on one side, and is acted on permanently by a resetting spring from another end face.

* * * * *